US008377319B2

(12) United States Patent
Chen et al.

(10) Patent No.: US 8,377,319 B2
(45) Date of Patent: Feb. 19, 2013

(54) PRINT HEAD NOZZLE FORMATION

(75) Inventors: Zhenfang Chen, Cupertino, CA (US); Andreas Bibl, Los Altos, CA (US); Paul A. Hoisington, Norwich, VT (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 835 days.

(21) Appl. No.: 12/027,597

(22) Filed: Feb. 7, 2008

(65) Prior Publication Data

US 2008/0128387 A1 Jun. 5, 2008

Related U.S. Application Data

(62) Division of application No. 10/913,571, filed on Aug. 5, 2004, now Pat. No. 7,347,532.

(51) Int. Cl.
*G01D 15/00* (2006.01)

(52) U.S. Cl. .................. 216/27; 216/2; 216/33; 216/36; 216/37; 216/41; 216/58; 216/67; 216/95

(58) Field of Classification Search .................... 216/27, 216/33, 2, 37, 36, 58, 67, 95, 41
See application file for complete search history.

(56) References Cited

U.S. PATENT DOCUMENTS 3,921,916 A 11/1975 Bassous
4,007,464 A 2/1977 Bassous et al.
4,475,113 A 10/1984 Lee et al.
5,562,801 A * 10/1996 Nulty ............................ 438/695
5,640,184 A 6/1997 Moynihan et al.
5,992,974 A 11/1999 Miyata et al.
6,170,934 B1 1/2001 Fujisawa et al.
6,180,533 B1 * 1/2001 Jain et al. ...................... 438/714
6,213,587 B1 4/2001 Whitman
6,238,584 B1 5/2001 Hawkins et al.
6,238,585 B1 5/2001 Miyata
6,375,313 B1 4/2002 Adavikolanu et al.
6,375,858 B1 4/2002 Makigaki et al.
6,423,476 B1 7/2002 Yun
6,718,632 B2 4/2004 Liu et al.
6,863,375 B2 3/2005 Makigaki et al.
6,988,316 B1 * 1/2006 Kweon et al. ................ 29/890.1
7,103,972 B2 * 9/2006 Chen et al. ................... 29/890.1
7,121,650 B2 10/2006 Chung et al.
8,043,518 B2 * 10/2011 Takahashi ....................... 216/27
(Continued)

FOREIGN PATENT DOCUMENTS

CN 1272818 11/2000
EP 0 576 007 12/1993
(Continued)

OTHER PUBLICATIONS

Bassous, E. et al., "Ink jet printing nozzle arrays etched in silicon", 1977, Applied Phys. Lett., vol. 31, p. 134-137.

(Continued)

*Primary Examiner* — Nadine Norton
*Assistant Examiner* — Christopher Remavege
(74) *Attorney, Agent, or Firm* — Fish & Richardson P.C.

(57) ABSTRACT

Techniques are provided for forming nozzles in a microelectromechanical device. The nozzles are formed in a layer prior to the layer being bonded onto another portion of the device. Forming the nozzles in the layer prior to bonding enables forming nozzles that have a desired depth and a desired geometry. Selecting a particular geometry for the nozzles can reduce the resistance to ink flow as well as improve the uniformity of the nozzles across the microelectromechanical device.

24 Claims, 14 Drawing Sheets

U.S. PATENT DOCUMENTS

| | | | | |
|---|---|---|---|---|
| 2003/0112300 | A1 | 6/2003 | Chung et al. | |
| 2003/0193549 | A1* | 10/2003 | Yasukawa et al. | 347/65 |
| 2004/0085409 | A1 | 5/2004 | Hashizume et al. | |
| 2005/0085086 | A1* | 4/2005 | Kanzawa | 438/706 |
| 2006/0028508 | A1 | 2/2006 | Chen et al. | |

FOREIGN PATENT DOCUMENTS

| | | |
|---|---|---|
| EP | 0 985 534 | 3/2000 |
| EP | 1 332 879 | 8/2003 |
| JP | 10-315461 | 12/1998 |
| JP | 2000-269106 | 9/2000 |
| JP | 2001-030500 | 2/2001 |
| JP | 2001-071512 | 3/2001 |
| JP | 2002-127429 | 5/2002 |
| JP | 2002-160373 | 6/2002 |
| JP | 2002-205404 | 7/2002 |
| JP | 2003-094667 | 4/2003 |
| JP | 2003-0237086 | 8/2003 |

OTHER PUBLICATIONS

Bassous, E., "Fabrication of novel three-dimensional microstructures by the anisotropic etching of (100) and (110) silicon", 1978, IEEE Trans. Electron Devices, vol., ED-25, pp. 1178-1185.

Bassous, E. et al., "The Fabrication of high precision nozzles by the anisotropic etching of (100) silicon", 1978, J. Electrochem, Soc., vol. 125, pp. 1321-1327.

Partial International Search Report, International Application U.S. Appl. No. PCT/US2005/028064, Nov. 22, 2005, 4 pp.

Notice of Reasons for Rejection, for Application No. 2007-525061, mailed Jan. 18, 2011, 10 pages.

Communication Pursuant to Article 94(3) EPC for EP Application Serial No. 05 783 403.8 dated Nov. 23, 2009, 4 pages.

Communication pursuant to Article 94(3) EPC, for Application No. 05 783 403.8, dated Dec. 23, 2010, 4 pages.

First Office Action for Application No. 200580033765.4, mailed Feb. 13, 2009, 8 pages.

Second Office Action for Application No. 200580033765.4, mailed Apr. 2, 2010, 7 pages.

Third Office Action for Application No. 200580033765.4, mailed Apr. 14, 2011, 8 pages.

Notice of Reasons for Rejection for Application No. 2007-525061, mailed Jun. 24, 2011, 8 pages.

Office action dated Feb. 10, 2012 issued in related Korean Application No. 2007-7003756.

Office action dated Nov. 7, 2011 issued in related Chinese Application No. 200580033765.4.

Japanese Office Action for Application No. 2011-089638, dated May 24, 2012, 12 pages.

* cited by examiner

PRINT HEAD NOZZLE FORMATION

CROSS-REFERENCE TO RELATED APPLICATIONS

This application is a divisional application and claims the benefit of priority under 35 U.S.C. Section 120 of U.S. application Ser. No. 10/913,571, filed Aug. 5, 2004, now U.S. Pat. No. 7,347,532, issued Mar. 25, 2008. The disclosure of the prior application is considered part of and is incorporated by reference in the disclosure of this application.

BACKGROUND

This invention relates to nozzle formation in a microelectromechanical device, such as an inkjet print head.

Printing a high quality, high resolution image with an inkjet printer generally requires a printer that accurately ejects a desired quantity of ink in a specified location. Typically, a multitude of densely packed ink ejecting devices, each including a nozzle 130 and an associated ink flow path 108, are formed in a print head structure 100, as shown in FIG. 1A. The ink flow path 108 connects an ink storage unit, such as an ink reservoir or cartridge, to the nozzle 130.

As shown in FIG. 1B, a side view of a cross section of a substrate 120 shows a single ink flow path 108. An ink inlet 118 is connected to a supply of ink. Ink flows from the ink storage unit (not shown) through the ink inlet 118 and into a pumping chamber 110. In the pumping chamber, ink can be pressurized to flow toward a descender region 112. The descender region 112 terminates in a nozzle that includes a nozzle opening 144, where the ink is expelled.

Various processing techniques are used to form the ink ejectors in the print head structure. These processing techniques can include layer formation, such as deposition and bonding, and layer modification, such as laser ablation, punching and cutting. The techniques that are used are selected based on a desired nozzle and flow path geometry along with the material that the ink jet printer is formed from.

SUMMARY

In general, in one aspect, the invention features techniques, including methods and apparatus, for forming devices. An aperture is etched into a first surface of a nozzle layer of a multi-layer substrate, where the multi-layer substrate also has a handle layer. The first surface of the nozzle layer is secured to a semiconductor substrate having a chamber such that the aperture is fluidly coupled to the chamber. A portion of the multi-layer substrate is removed, including at least the handle layer of the multi-layer substrate, such that the chamber is fluidly coupled to the atmosphere through the aperture.

The nozzle layer can be between about 5 and 200 microns, or less than 100 microns thick. The thickness of the nozzle layer can be reduced prior to etching, such as by grinding the nozzle layer. The nozzle layer can include silicon. The multi-layer substrate can include a silicon-on-insulator substrate. The aperture can be etched with an anisotropic etch or by deep reactive ion etch. The aperture can have tapered or straight parallel walls. The aperture can have a rectangular or round cross section.

Another aspect of the invention features forming a printhead with a main portion having a pumping chamber and a nozzle portion connected to the main portion. The nozzle portion has a nozzle inlet and a nozzle outlet. The nozzle inlet has tapered walls centered around a central axis. The tapered walls lead to the nozzle outlet and the nozzle outlet has substantially straight walls that are substantially free of any surfaces that are orthogonal to the central axis.

In yet another aspect, the invention features a fluid ejection nozzle layer with a body having a recess with tapered walls and an outlet. The recess has a first thickness and the outlet has a second thickness. The first and second thicknesses together are less than about 100 microns.

In another aspect, the invention features a fluid ejection device with a semiconductor substrate having a chamber secured to a first surface of a semiconductor nozzle layer having an aperture. The semiconductor substrate has a chamber that is fluidly coupled to the atmosphere through the aperture. The semiconductor nozzle layer is about equal to or less than 100 microns thick.

Particular implementations can include none, one or more of the following advantages. Nozzles can be formed with almost any desired depth, such as around 10-100 microns, e.g., 40-60 microns. Flow path features can be formed at high etch rates and at high precision. If the nozzle layer and the flow path module are formed from silicon, the layers and module can be bonded together by direct silicon bonding or anodic bonding, thus eliminating the need for a separate adhesive layer. Forming the nozzles in a separate layer from the flow path features allows for additional processing on the back side of the layer in which the nozzles are formed, such as grinding, deposition or etching. The nozzles can be formed with a geometry that can reduce ink flow resistance. Trapping of air can be reduced or eliminated. Thickness uniformity of the nozzle layer can be controlled separately from the thickness uniformity of the substrate in which the flow path features are formed. If the nozzle layer were thinned after being connected to the flow path substrate, it could potentially be difficult to independently control the thickness of the nozzle layer.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Techniques are provided for controlling the ejection of ink from a fluid ejector or an inkjet print head by forming ejection nozzles with a desired geometry. A print head body can be manufactured by forming features in individual layers of semiconductor material and attaching the layers together to form the body. The flow path features that lead to the nozzles, such as the pumping chamber and ink inlet, can be etched into a substrate, as described in U.S. patent application Ser. No. 10/189,947, filed Jul. 3, 2002, using conventional semiconductor processing techniques. A nozzle layer and the flow path module together form the print head body through which ink flows and from which ink is ejected. The shape of the nozzle through which the ink flows can affect the resistance to ink flow. By etching the nozzle into the back side of the nozzle layer, i.e., the side that is joined to the flow path module, before the nozzle layer is secured to the flow path module, nozzles can be formed with a desired and uniform geometry. Nozzle geometries can be created that may not otherwise be achieved when the nozzle features are only etched from one side of the layer. In addition, the nozzle feature depth can be precisely selected when the back side of the nozzle layer is etched.

Figure 1A:
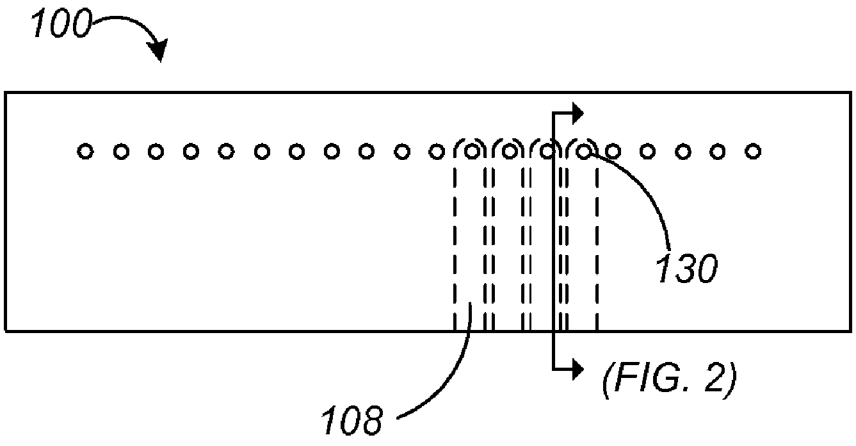
PRIOR ART FIG. 1A
FIG. 1A shows a perspective view of flow paths in a substrate.
Figure 1B:
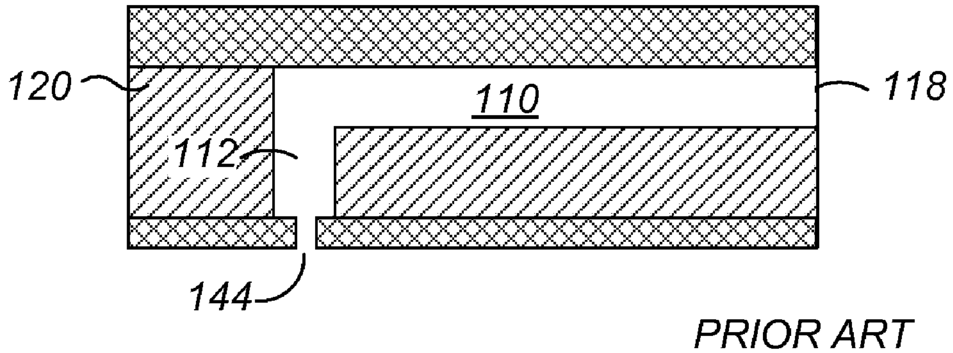
PRIOR ART FIG. 1B
FIG. 1B is a cross-sectional view of a print head flow path.
Figure 2A:
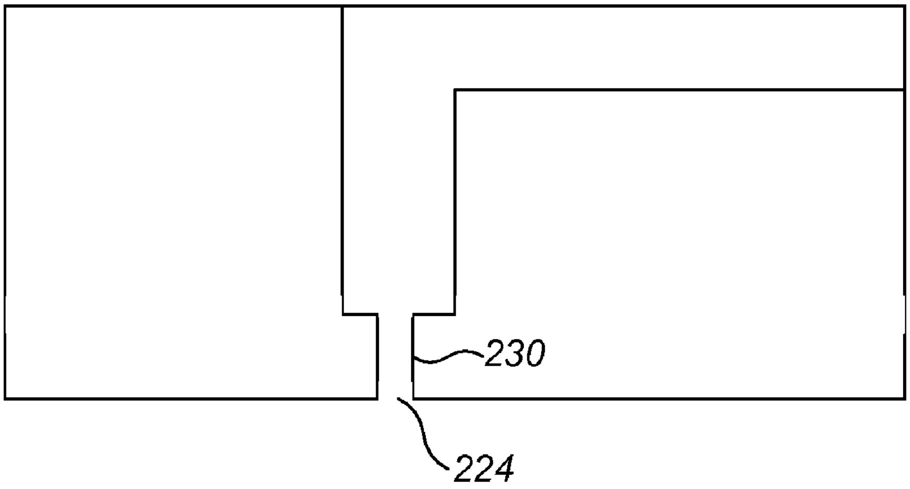
FIG. 2A is a cross-sectional view of a print head flow path with a nozzle having walls that are substantially parallel to one another.
Figure 2B:
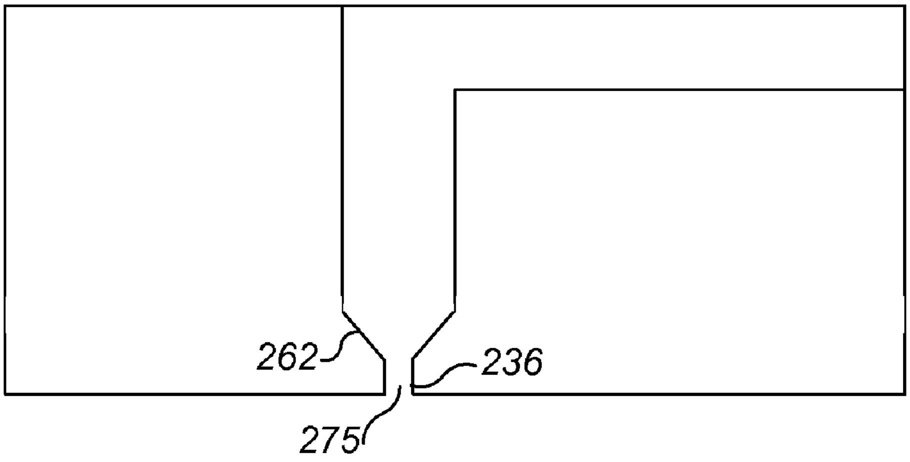
FIG. 2B is a cross-sectional view of a print head flow path with a nozzle having tapered walls.

In one implementation, the nozzle depth is selected by forming the nozzle feature in a layer of material having the thickness equal to that of the final nozzle depth, and the nozzle 224 is formed to have a cross-section with substantially consistent geometry, such as perpendicular walls 230, as shown in FIG. 2A. In another implementation, multiple etching techniques are employed to form a nozzle having multiple portions that each have a different geometry. The nozzle 224 is formed to have an upper portion that has a conical or pyramidal cross-section 262 and a lower portion with substantially perpendicular walls 236 that leads to the nozzle outlet 275, as shown in FIG. 2B. Each of the implementations will be discussed in turn below.

Figure 3:
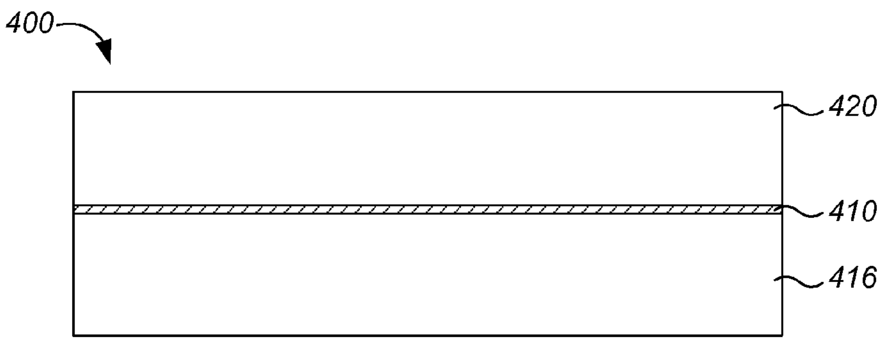
FIGS. 3-8 show one implementation of forming a nozzle in a nozzle layer.

Forming the nozzle with a substantially consistent geometry, either with perpendicular walls or a pyramidal geometry is described further below. As shown in FIG. 3, a multi-layer substrate, such as a silicon-on-insulator (SOI) substrate 400, can be formed or provided. The SOI substrate 400 includes a handle layer of silicon 416, an insulator layer 410 and a nozzle layer of silicon 420. One method of forming an SOI substrate is to grow an oxide layer on a double side polished (DSP) silicon substrate to form the insulator layer 410. The oxide layer can be from 0.1 to 100 microns thick, such as about 5 microns. A second double side polished silicon substrate can then be bonded to the exposed surface of the oxide layer to complete the SOI substrate 400. When forming the oxide layer on the DSP substrate, the oxide can be grown on all exposed surfaces of the substrate. After the bonding step, any exposed oxide that is not desired can be etched away, such as by dry etching.

Different types of SOI substrates can also be used. For example, the SOI substrate 400 can include an insulator layer 410 of silicon nitride instead of an oxide. As an alternative to bonding together two substrates to form the SOI substrate 400, a silicon layer can be formed on the insulator layer 410, such as by a deposition process.

Figure 4:
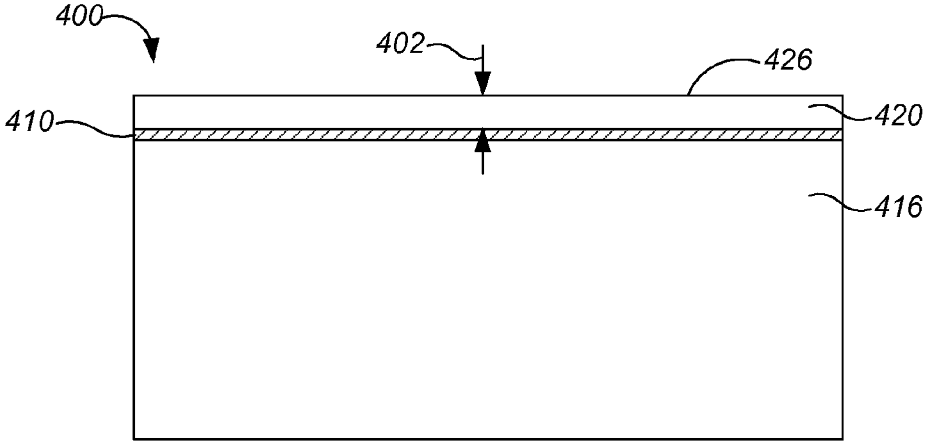

As shown in FIG. 4, the nozzle layer 420 of the SOI substrate 400 is thinned to a desired thickness 402. One or more grinding and/or etching steps, such as a bulk grinding step, can be used to achieve the desired nozzle layer thickness 402. The nozzle layer 420 is ground as much as possible to achieve the desired thickness, because grinding can control thickness precisely. The nozzle layer thickness 402 can be about 10 to 100 microns, e.g., between about 40 and 60 microns. Optionally, a final polish of the back side 426 of the nozzle layer 420 can decrease surface roughness. Surface roughness is a factor in achieving a silicon to silicon bond, as described below. The polishing step can introduce uncertainty in thickness and is not used for achieving the desired thickness.

Figure 5:
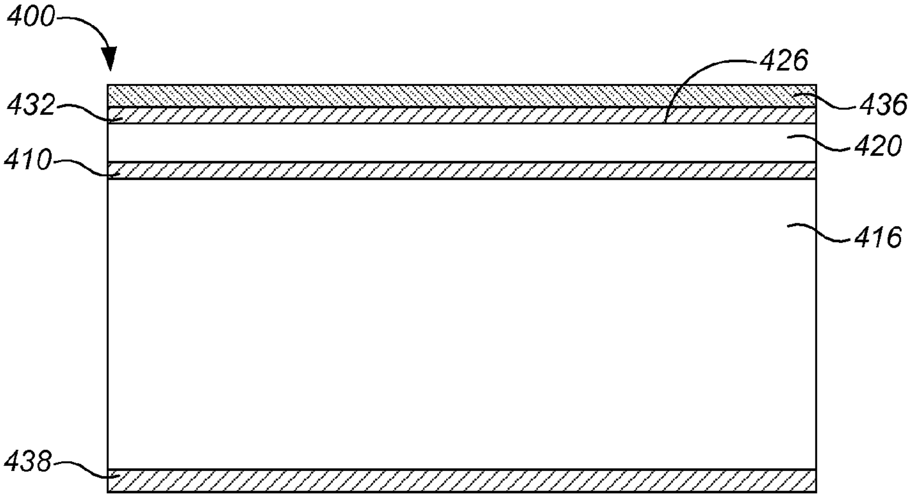

Referring to FIG. 5, once the desired thickness of the nozzle layer 420 has been achieved, the back side 426 of the nozzle layer 420 is prepared for processing. The processing can include etching. One exemplary etching process is described, however, other methods may be suitable for etching the nozzle layer 420. If the nozzle layer 420 does not already have an outer oxide layer, the SOI substrate 400 can be oxidized to form a back side oxide layer 432 and a front side oxide layer 438. A resist layer 436 is then coated on the back side oxide layer 432.

Figure 6:
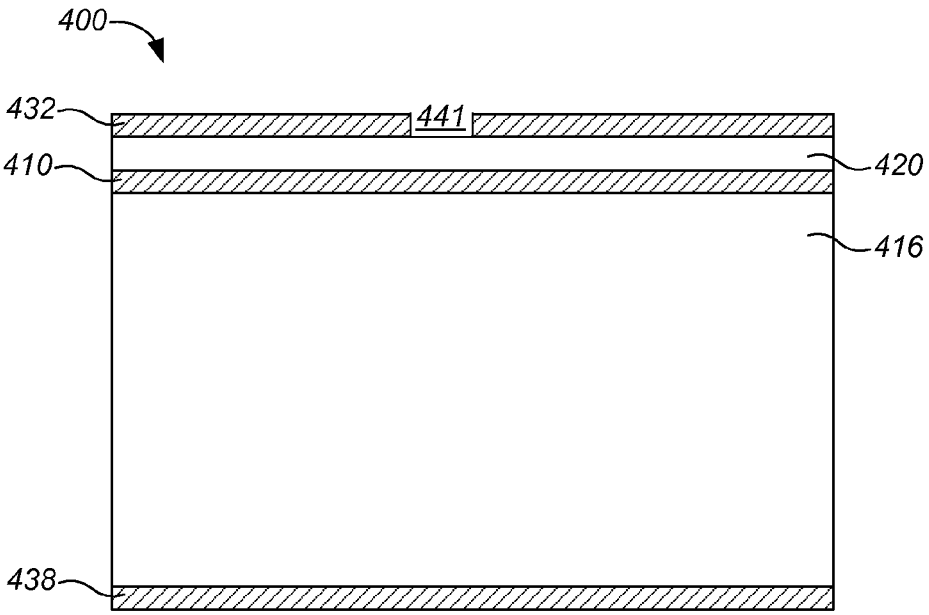

The resist 436 is patterned to define the location 441 of the nozzle. Patterning the resist 436 can include conventional photolithographic techniques followed by developing or washing the resist 436. The nozzle can have a cross section that is substantially free of corners, such as a circular, elliptical or racetrack shape. The back side oxide layer 432 is then etched, as shown in FIG. 6. The resist layer 436 can optionally be removed after the oxide etch.

Figure 7A:
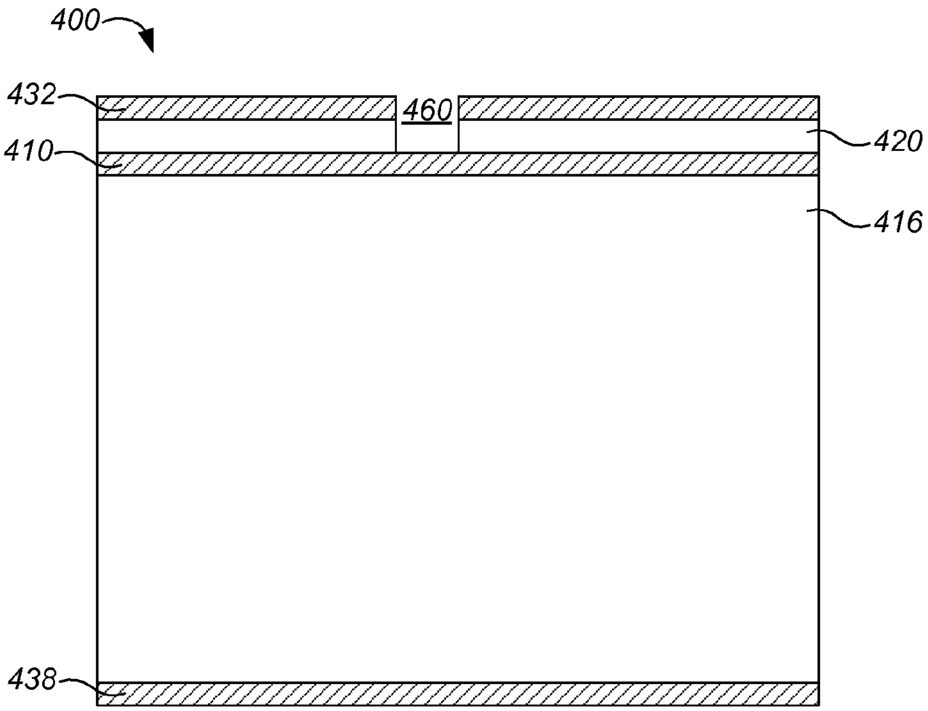

The silicon nozzle layer 420 is then etched to form the nozzle 460, as shown in FIG. 7A. During the etch process, the insulator layer 410 serves as an etch stop. The silicon nozzle layer 420 can be etched, for example, by deep reactive ion etching (DRIE). DRIE utilizes plasma to selectively etch silicon to form features with substantially vertical sidewalls. DRIE is substantially insensitive to silicon geometry and etches a straight walled hole to within ±1°. A reactive ion etching technique known as the Bosch process is discussed in Laermor et al. U.S. Pat. No. 5,501,893, the entire contents of which is incorporated hereby by reference. The Bosch technique combines an etching step with a polymer deposition to etch relatively deep features. Because of the alternative etching and deposition, the walls can have a slight scallop contour, which can keep the walls from being perfectly flat. Other suitable DRIE etch techniques can alternatively be used to etch the nozzle layer 420. Deep silicon reactive ion etching equipment is available from Surface Technology Systems, Ltd., located in Redwood City, Calif., Alcatel, located in Plano, Tex., or Unaxis, located in Switzerland and reactive ion etching can be conducted by etching vendors including Innovative Micro Technology, located in Santa Barbara, Calif. DRIE is used due to its ability to cut deep features of substantially constant diameter. Etching is performed in a vacuum chamber with plasma and gas, such as, $SF_6$ and $C_4F_8$.

Figure 7B:
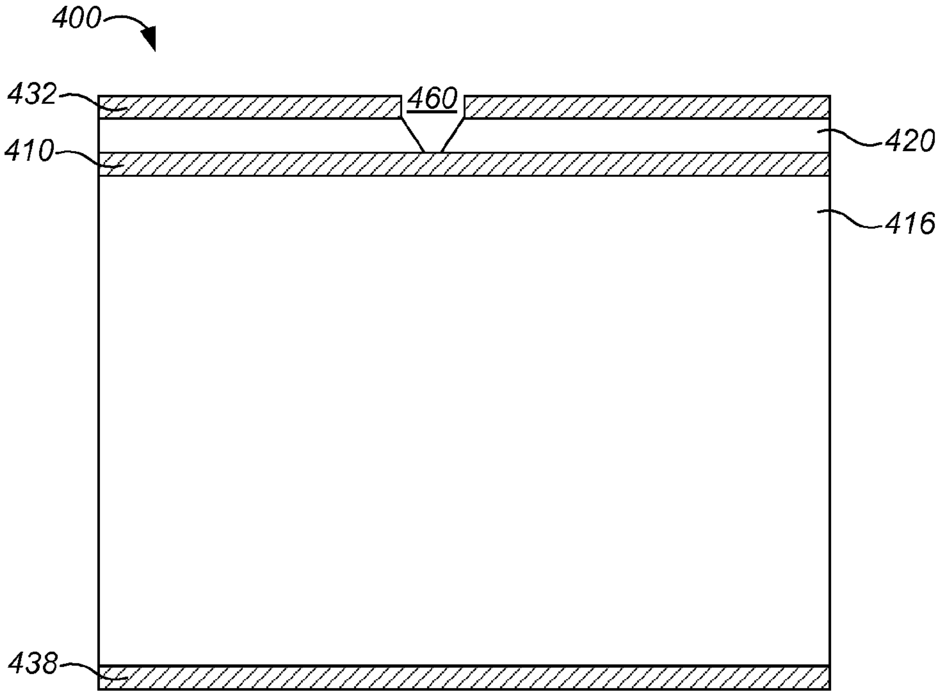

In one implementation, rather than etching with DRIE the silicon nozzle layer 420, an etch is performed to create tapered walls, as shown in FIG. 7B. Tapered walls can be formed by anisotropically etching the silicon substrate. An anisotropic etch, such as a wet etch technique, can include, but is not limited to, a technique that uses ethylenediamine or KOH as the etchant. Anisotropic etching removes molecules from the 100 plane much more quickly than from the 111 plane, thus forming the tapered walls. An anisotropic etch on a substrate with the 111 plane at the exposed surface exhibits a different etch geometry than a substrate with a 100 plane at the surface.

Figure 8:
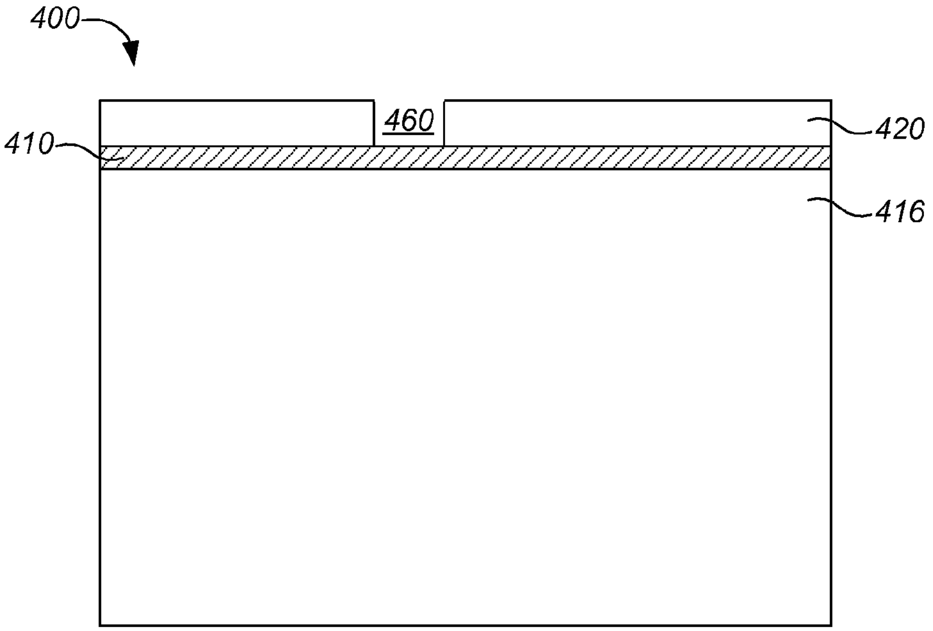

When the nozzle is complete, the back side oxide layer 432 is stripped from the substrate, such as, by etching, as shown in FIG. 8.

Figure 9:
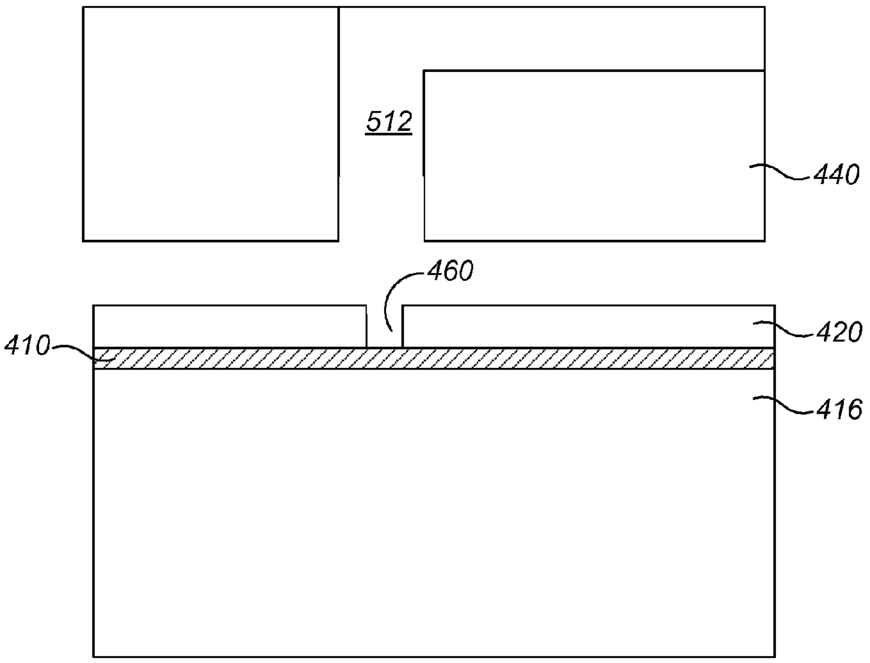
FIGS. 9-13 show the steps of joining a flow path module to the nozzle layer and completing the nozzle.
Figure 10:
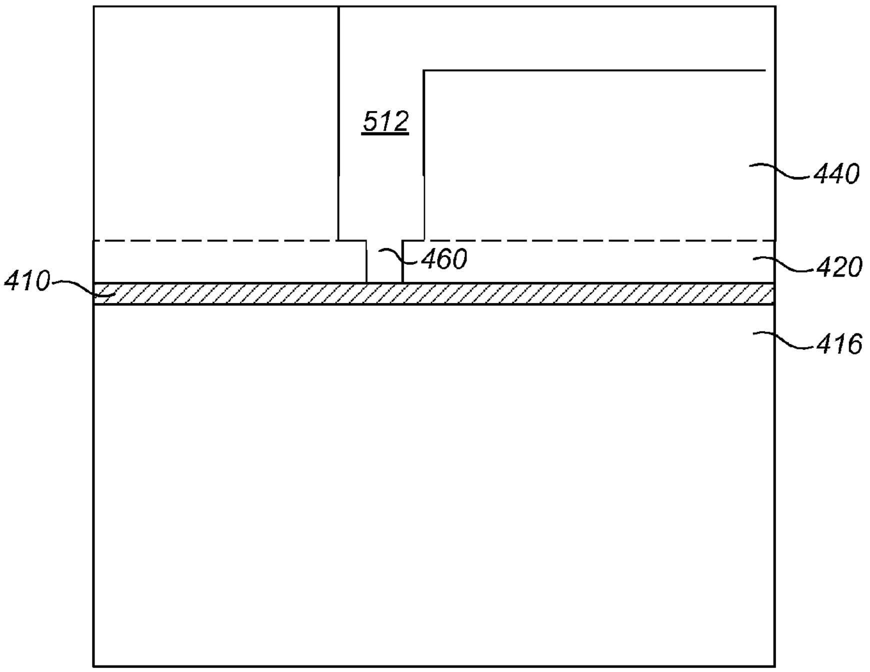

The etched silicon nozzle layer 420 is then aligned to a flow path module 440 that has the descender 512 and other flow path features in preparation for bonding, as shown in FIG. 9. The surfaces of the flow path module 440 and the nozzle layer 420 are first cleaned, such as by reverse RCA cleaning, i.e., performing an RCA2 clean consisting of a mixture of DI water, hydrochloric acid and hydrogen peroxide followed by an RCA1 clean in a bath of DI water, ammonium hydroxide and hydrogen peroxide. The cleaning prepares the two elements for direct silicon bonding, or the creation of Van der Waal's bonds between the two silicon surfaces. Direct silicon bonding can occur when two flat, highly polished, clean silicon surfaces are brought together with no intermediate layer between the two silicon layers. The flow path module 440 and the nozzle layer 420 are positioned so that the descender 512 is aligned with the nozzle 460. The flow path module 440 and nozzle layer 420 are then brought together. Pressure is placed at a central point of the two layers and allowed to work its way toward the edges. This method reduces the likelihood of voids forming at the interface of the two layers. The layers are annealed at an annealing temperature, for example, around 1050° C.-1100° C. An advantage of direct silicon bonding is that no additional layer is formed between the flow path module 440 and the nozzle layer 420. After direct silicon bonding, the two silicon layers become one unitary layer such that no or virtually no delineation between the two layers exists when the bonding is complete, as shown in FIG. 10 (the dotted line shows the former surfaces of the flow path module 440 and nozzle layer 420).

As an alternative to directly bonding two silicon substrates together, a silicon layer and an oxide layer can be anodically bonded together. The anodic bonding includes bringing together the silicon and oxide layers and applying a voltage across the substrates to induce a chemical bond.

Figure 11:
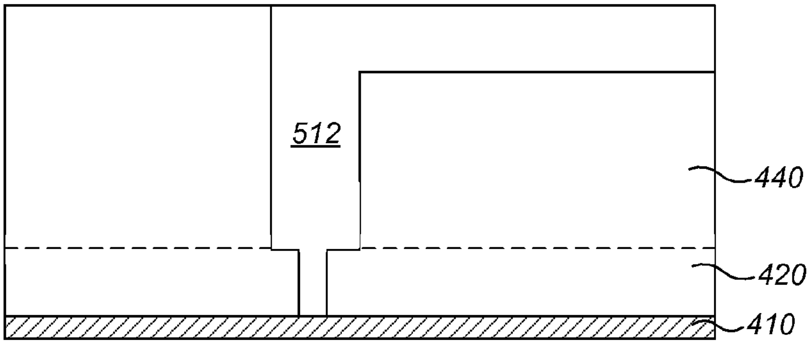

Once the flow path module 440 and nozzle layer 420 are bonded together, the handle layer 416 is removed. Specifically, the handle layer 416 can be subjected to a bulk polishing process (and optionally a finer grinding or etching process) to remove a portion of the thickness, as shown in FIG. 11.

Figure 12:
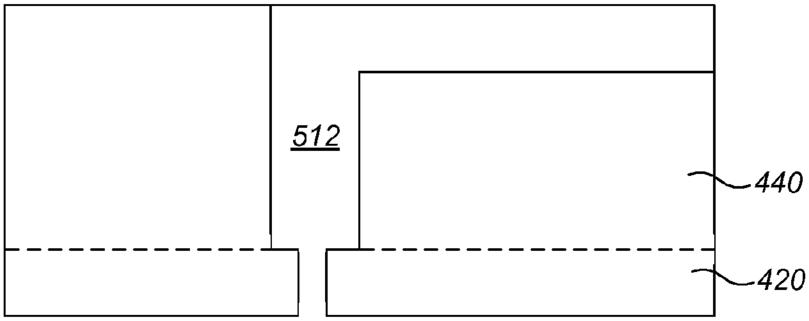

As shown in FIG. 12, the oxide layer can be completely removed by etching, thus exposing the nozzle opening. Although this implementation has parallel side walls, the nozzle could have tapered walls if the etching process shown in FIG. 7B were to be used.

Figure 13:
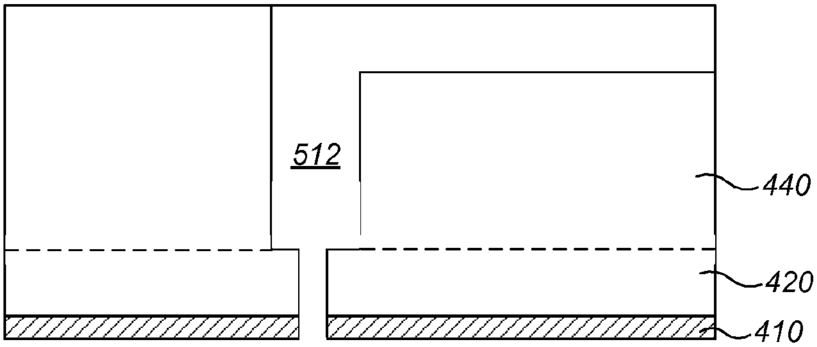

As shown in FIG. 13, alternatively, the insulator layer 410 can be left on the nozzle layer 420 and etched through from the outer surface to form a part of the nozzle opening.

In one implementation, the back side etch process is performed to create a nozzle with multiple portions having different geometries.

Figure 14:
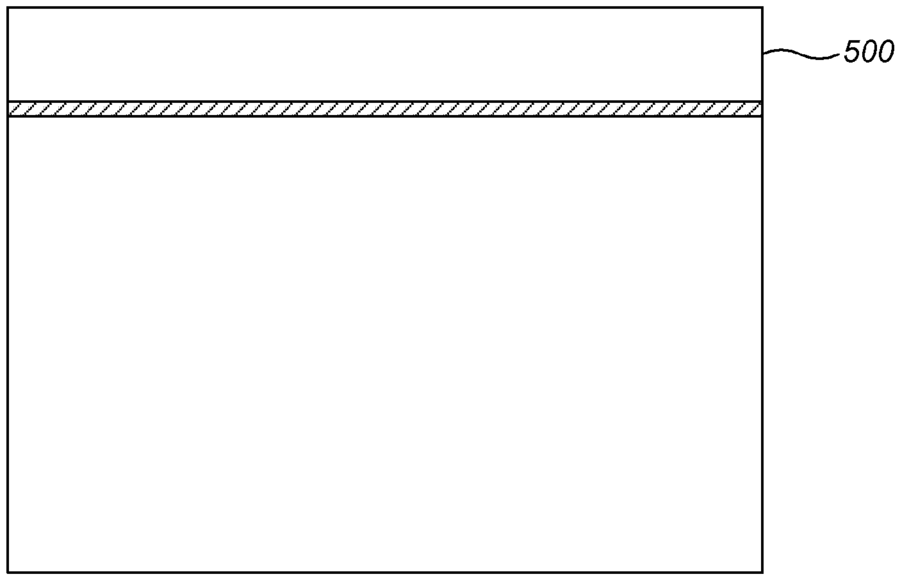
FIGS. 14-23 show a second implementation of forming a nozzle in a nozzle layer.

The nozzle can be formed in either a 100 plane DSP wafer or a SOI substrate with a nozzle layer 500 that is a 100 plane silicon, as shown in FIG. 14. The nozzle layer 500 can be thinned to the desired thickness, as described above. The thickness can be between around 1 and 100 microns, such as between about 20 and 80 microns, e.g., around 30 to 70 microns.

Figure 15:
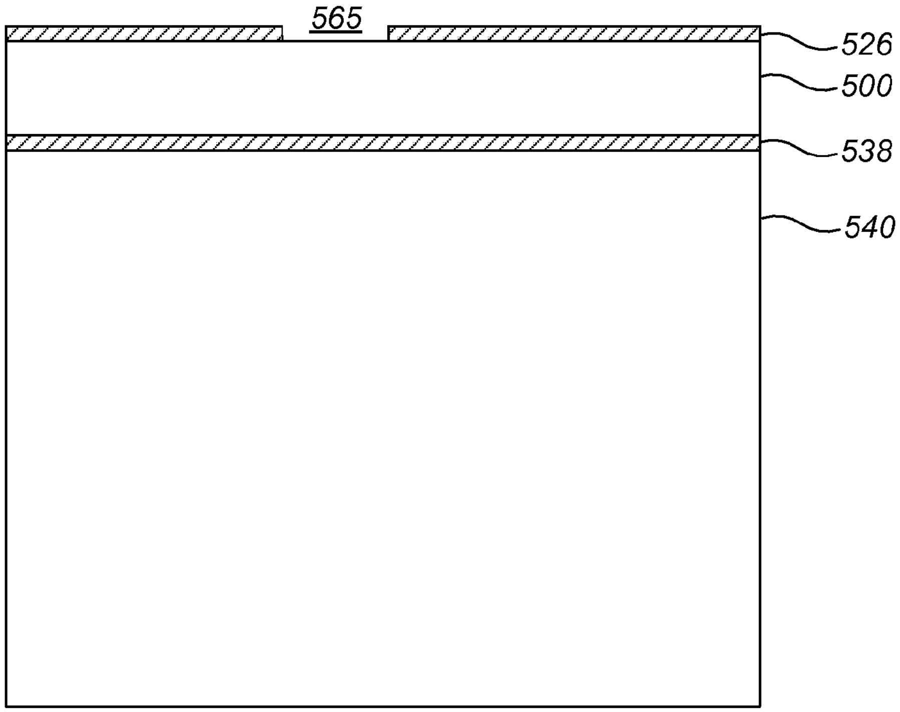

Referring to FIG. 15, an oxide layer is grown on the silicon nozzle layer 500 to form a back side oxide 526. An insulator layer 538 and a handle layer 540 are on the opposite side of the nozzle layer 500 from the back side oxide 526. A resist can be formed on the back side oxide 526, such as by spinning-on the resist. The resist can be patterned to define the location of the nozzle. The location of the nozzle is formed by creating an opening 565 in the back side oxide 526.

Figure 16A:
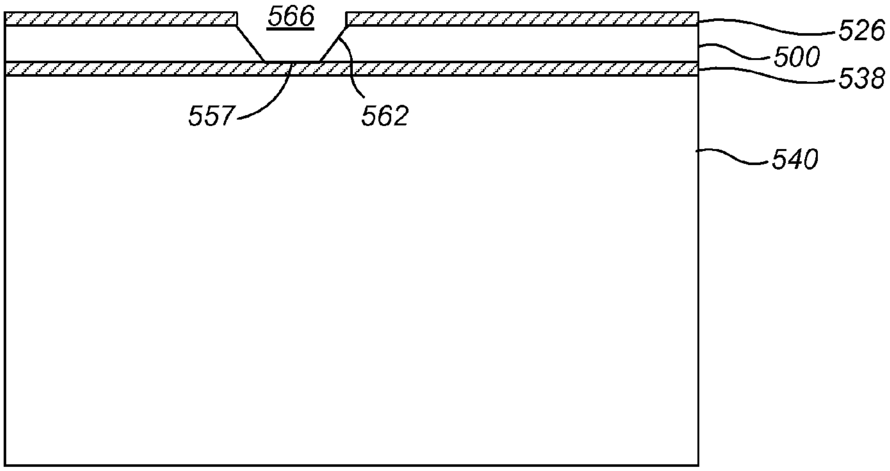
Figure 16B:
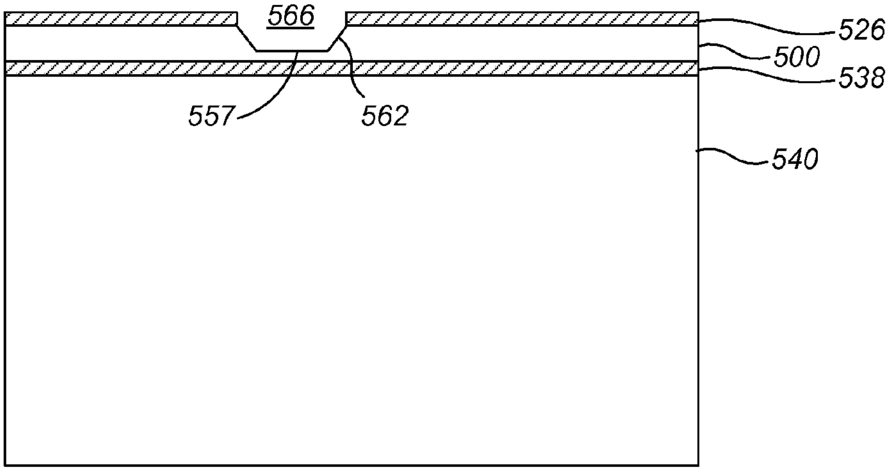
Figure 16C:
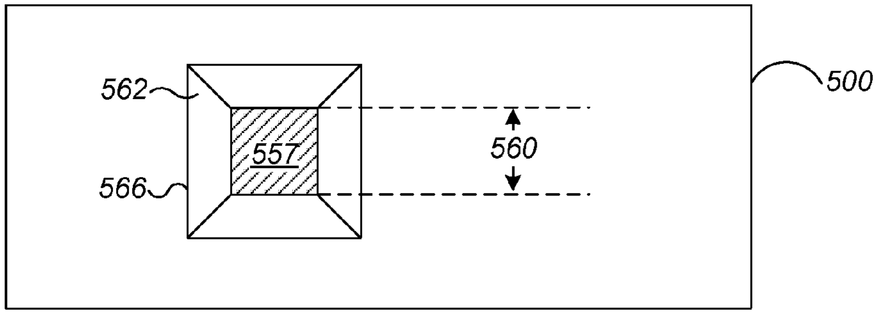

Referring to FIGS. 16A, 16B and 16C, the nozzle layer 500 is etched using an anisotropic etch, such as a wet etch technique. The etch defines a recess 566 in the silicon nozzle layer 500 that has an inverted pyramid shape, or is the shape of a pyramidal frustum with a base, a recessed surface 557 parallel to the base and sloped walls 562. The tapered wall 562 meets the recessed surface 557 at an edge having a length 560. The recess 566 can be etched through to the insulator layer 538, as shown in FIG. 16A. Alternatively, the recess 566 can extend only partially through the nozzle layer 500, as shown in FIG. 16B. If the recess 566 is not etched through to the insulator layer 538, substantially constant recess depths can be achieved by controlling the etch time and rate. A wet etch using KOH has an etch rate that is dependent on temperature. The recess 566 can be about 1 to about 100 microns deep, such as about 3 to 50 microns.

Figure 17:
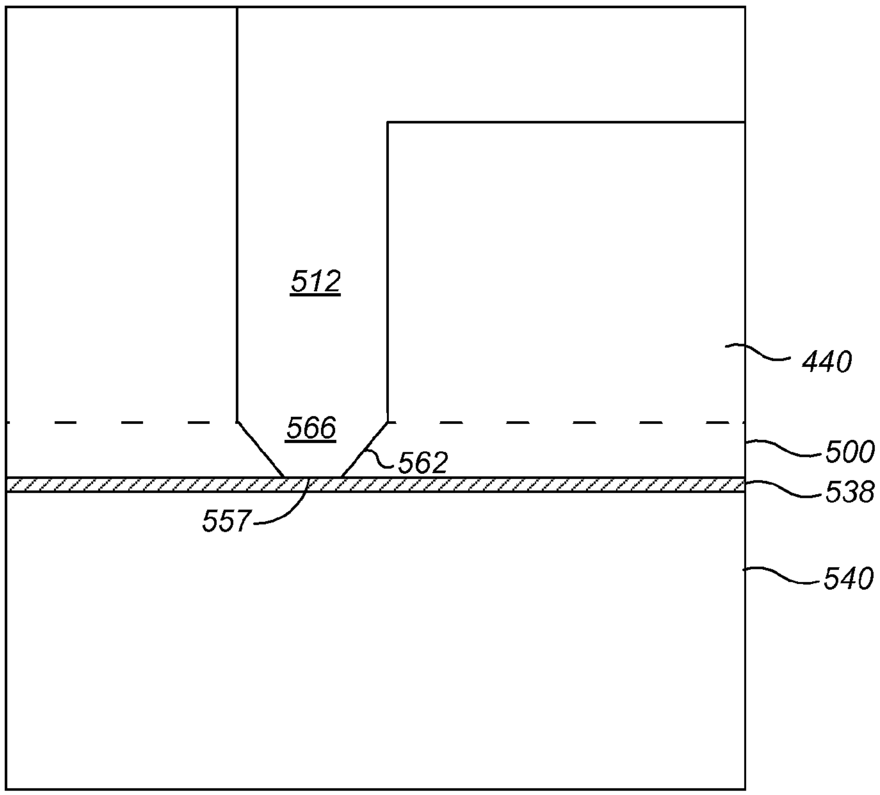

As shown in FIG. 17, the etched nozzle layer 500 is joined with a flow path module 440. The nozzle layer 500 is joined with the flow path module 440 so that the descender 512 is aligned with the recess 566. The nozzle layer 500 and the flow path module 440 can be bonded together with an adhesive, an anodic bond or a direct silicon bond (fusion bond). If a direct silicon bond is selected, the back side oxide 526 is removed prior to bonding.

Figure 18:
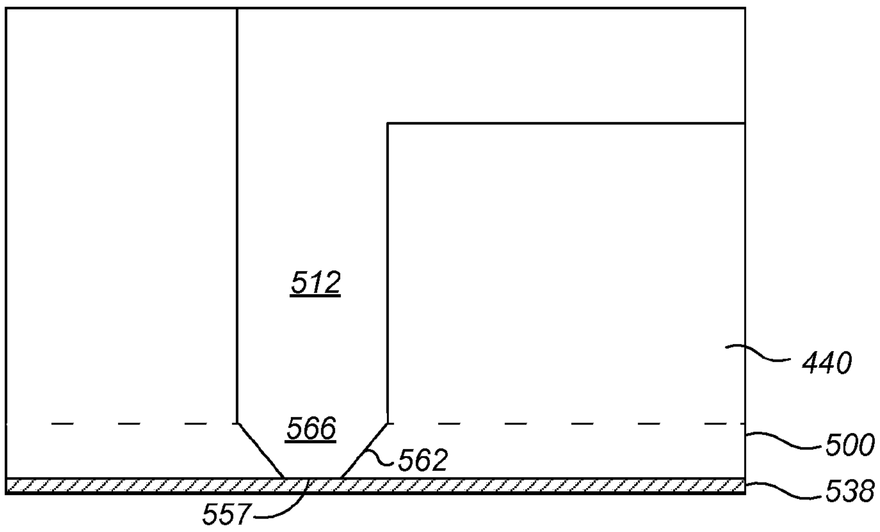

As shown in FIG. 18, the handle layer 540 is removed. The handle layer 540 can be removed, such as by grinding, etching or a combination of grinding and etching.

Figure 19:
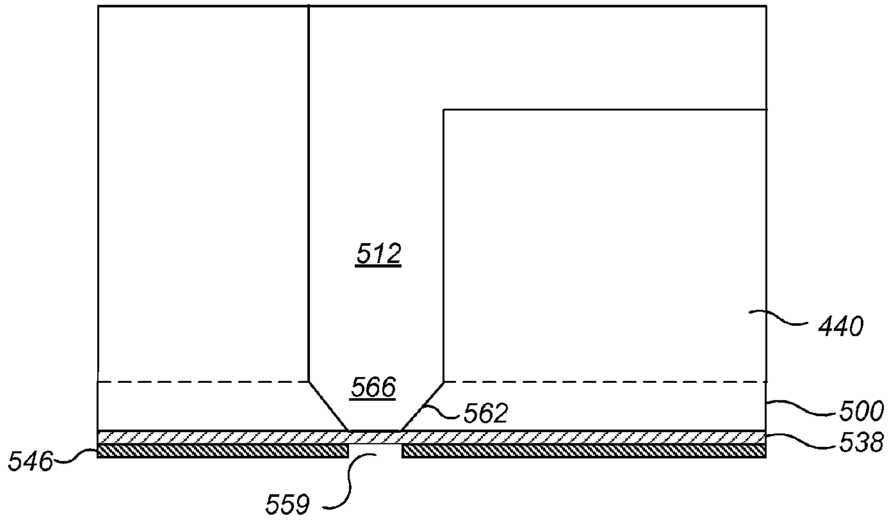

To achieve the desired nozzle geometry, the front side of the nozzle layer 500 is also etched. As shown in FIG. 19, the front side is prepared for etching by coating a resist 546 on the insulator layer 538 and patterning the resist 546, as described above. The resist is patterned such that the underlying insulator layer 538 is exposed in areas that correspond to the recesses 566 formed in the back side of the nozzle layer 500.

Figure 20A:
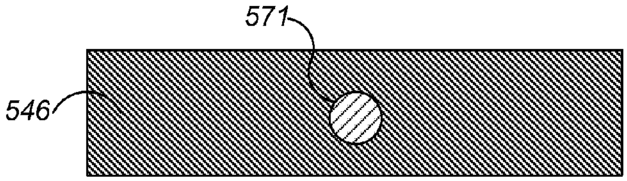
Figure 20B:
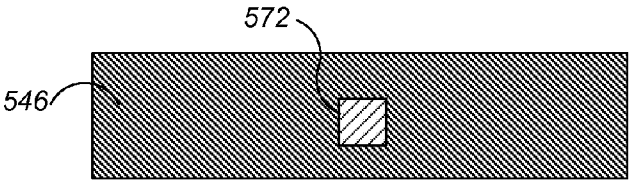
Figure 21:
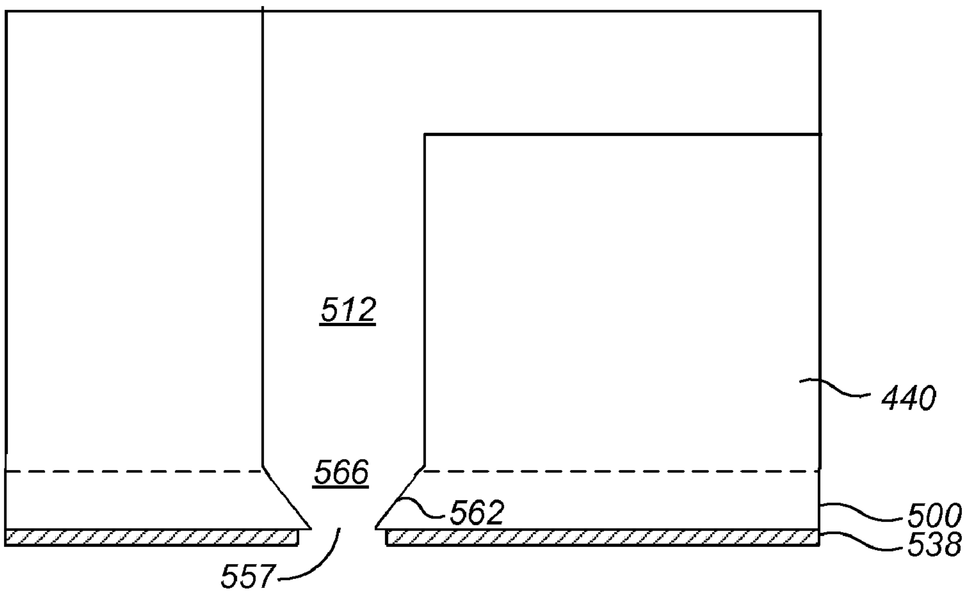

As shown in FIGS. 20A and 20B, respectively, a view of the front side of the nozzle layer 500 shows that the resist 546 can be patterned with a circular opening 571 or a rectangular opening 572. Other opening geometries may be suitable, such as a polygon with five or more sides. The exposed oxide is etched in a location 559 corresponding to the recess 566 to expose the underlying nozzle layer 500, as shown in FIG. 21.

Figure 22:
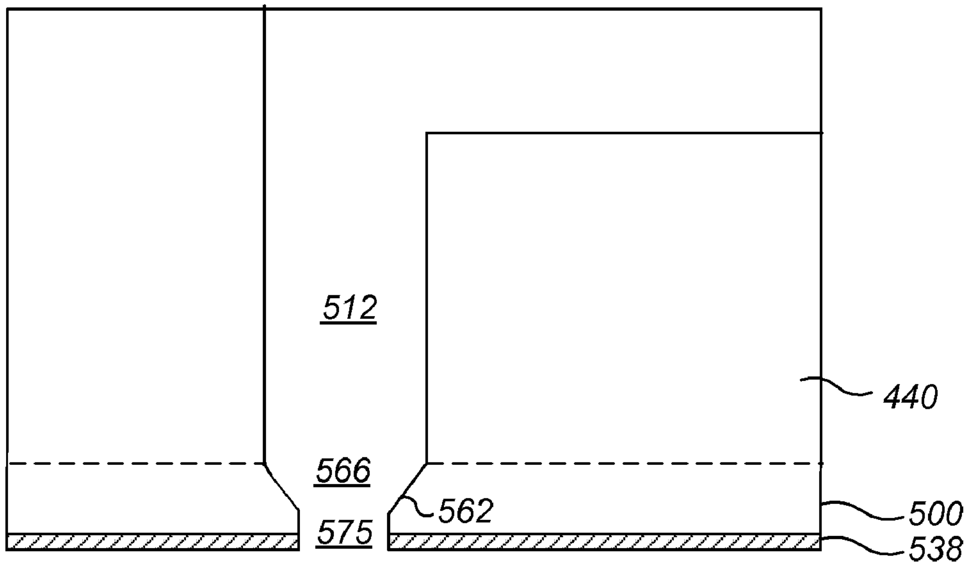

Referring to FIG. 22, the nozzle layer 500 is etched to form a nozzle outlet 575. The etch process used can be DRIE, so that the nozzle outlet 575 has substantially straight walls, as described above. This can form a nozzle outlet 575 that converges at a point beyond the exterior of the nozzle outlet 575. The nozzle outlet can be about 5 to 40 microns in diameter, such as about 25 microns in diameter. The diameter 577 of the nozzle outlet 575 is sufficient to intersect the tapered walls 562 of the recess 566. The nozzle recess 566 forms the nozzle entry.

Figure 23A:
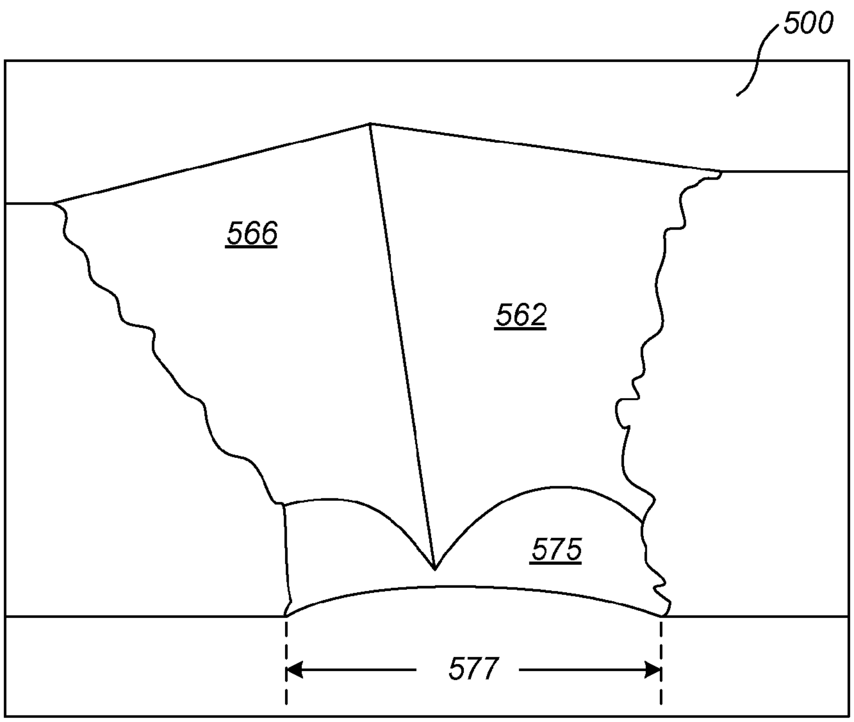
Figure 23B:
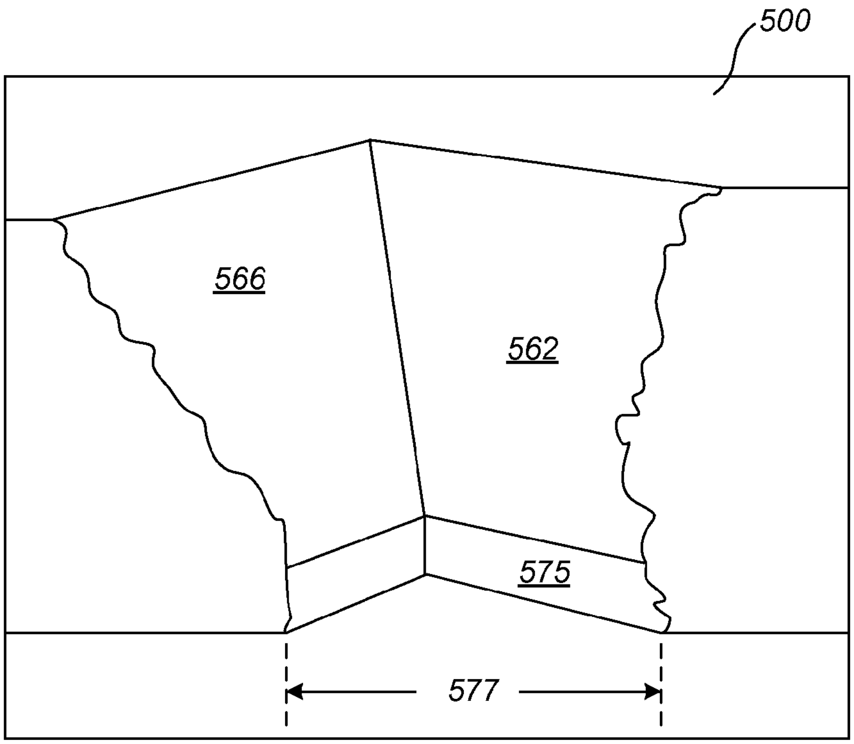

Referring to FIGS. 23A and 23B, a side cross sectional view of the nozzle layer shows the intersection of the tapered walls 562 and the nozzle outlet 575. The diameter of the nozzle outlet 575 is large enough so that the intersection between the recess 566 and the nozzle outlet 575 can remove any portion of the recessed surface 557, even if the recess 566 did not extend to the insulator layer when the recess was formed. Therefore, the nozzle outlet 575 is formed to have a dimension 577 that is equal to or greater than the length 560 of the wall 562 where the wall 562 meets the recessed surface 557. In one implementation, the diameter of the nozzle outlet 575 is less than the recessed surface of the pyramidal frustum and a portion of the recessed surface remains after the outlet 575 is formed.

Figure 24:
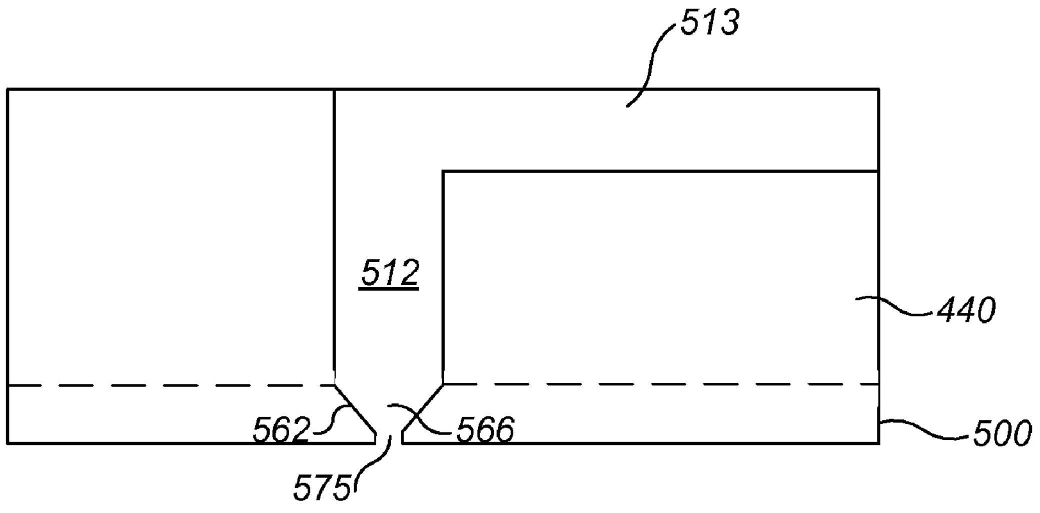
FIG. 24 shows a cross-sectional view of a print head flow path.

As shown in FIG. 24, the nozzle layer processing is completed. The back side oxide layer 526 is removed. The pyramidal nozzle inlet can have a depth of between about 10 to 100 microns, such as about 30 microns. The nozzle outlet 575 can have a depth of between about 2 and about 20 microns, such as about 5 microns.

Modifications can be made to the above mentioned processes to achieved the desired nozzle geometry. In one implementation, all of the etching is performed from the back side of the nozzle layer 500. In another implementation, the insulator layer 538 is not removed from the nozzle. To complete the nozzle, the insulator layer 538 can be etched so that the walls of the opening are substantially the same as the walls of the nozzle outlet 575, as shown in FIG. 22. Alternatively, the walls of the opening in the insulator layer 538 can be different from the walls of the nozzle outlet 575. For example, the nozzle opening 575 can have tapered walls that lead into a straight walled portion formed in the insulator layer 538. Forming the opening in the insulator layer 538 can either occur before or after attaching the nozzle layer 500 with a flow path module 440.

One potential disadvantage of forming the nozzles in a separate substrate is that the depth of the nozzles may be limited to a particular range of thicknesses, such as more than about 200 microns. Processing substrates thinner than about 200 microns can lead to a drop in yield, because of the increased likelihood of damaging or breaking the substrate. A substrate generally should be thick enough to facilitate substrate handling during processing. If the nozzles are formed in a layer of an SOI substrate, the layer can be ground to the desired thickness prior to formation while still providing a different thickness for handling. The handle layer also provides a portion that can be grasped during processing without interfering with the processing of the nozzle layer.

Forming the nozzle in a layer of a desired thickness can obviate the step of reducing the nozzle layer after the nozzle layer has been joined with the flow path module. Grinding away the handle layer after the nozzle layer is joined with the flow path module does not leave the flow path features open to grinding solution or waste grinding material. When the insulator layer is removed after the nozzle layer is joined to the flow path module, the insulator layer can be selectively removed so that the underlying silicon layer is not etched.

A nozzle formation process that uses two types of processing can form nozzles with intricate geometries. An anisotropic back side etch can form a recess in the shape of a pyramidal frustum having a base at the surface of the substrate, sloped or tapered walls and a recessed surface in the substrate. A front side etch that is configured so that the diameter is greater than the diameter of the recessed surface of the pyramidal frustum removes the recessed surface of the pyramidal frustum shape from the recess and the nozzle. This technique removes any substantially flat surface that is orthogonal to the direction of ink flow from the nozzle. This can reduce the incident of trapped air in the nozzle. That is, tapered walls that are formed by the anisotropic etch can keep the ink flow resistance low, while accommodating a large amount of meniscus pull-back during fill without air ingestion. The tapered walls of the nozzle smoothly transitions into the straight parallel walls of the nozzle opening, minimizing the tendency of the flow to separate from the walls. The straight parallel walls of the nozzle opening can direct the stream or droplet of ink out of the nozzle.

The depth of the anisotropic etch directly affects the length of both the nozzle entry and the nozzle outlet if the nozzle opening is not formed with a diameter greater than the diameter of the recessed surface of the pyramidal frustum. The anisotropic etch depth is determined by the length of time of the etch along with the temperature at which the etch is performed and can be difficult to control. The geometry of a DRIE etch may be easier to control than the depth of an anisotropic etch. By intersecting the walls of the nozzle outlet with the tapered walls of the nozzle entry, variations in depth of the anisotropic etch do not affect the final nozzle geometry. Therefore, intersecting the walls of the nozzle outlet with the tapered walls of the nozzle entry can lead to higher uniformity within a single print head and across multiple print heads.

A number of implementations of the invention have been described. Nevertheless, it will be understood that various modifications may be made without departing from the spirit and scope of the invention. Exemplary methods of forming the aforementioned structures have been described. However, other processes can be substituted for those that are described to achieve the same or similar results. For example, tapered nozzles can be formed by electroforming, laser drilling or Electrical Discharge Machining. The apparatus described can be used for ejecting fluids other than inks. Accordingly, other embodiments are within the scope of the following claims.

What is claimed is:

1. A method of forming a device, comprising:

etching a recess into a first surface of a nozzle layer of a multi-layer silicon substrate, wherein the multi-layer silicon substrate has a handle layer and a silicon oxide layer between the nozzle layer and the handle layer, and wherein the recess includes tapered sidewalls and a bottom surface having a first width measured in a direction parallel to the first surface;

securing the first surface of the nozzle layer to a substrate having a chamber such that the recess is fluidly coupled to the chamber;

after the securing, removing a portion of the multi-layer silicon substrate from an exposed side of the multi-layer silicon substrate, including at least the handle layer of the multi-layer silicon substrate; and etching a portion of the nozzle layer, from an exposed side of the nozzle layer using the silicon oxide layer as a mask, the etching including an anisotropic etch of a region on the exposed side having a second width measured in the direction parallel to the first surface, the second width greater than the first width such that portions of the tapered sidewalls of the recess are removed and the chamber is fluidly coupled to the atmosphere through the recess.

2. The method of claim 1, wherein etching the recess includes etching the recess into a nozzle layer that is less than 100 microns thick.

3. The method of claim 1, wherein:

etching the recess into a first surface of a nozzle layer includes etching into silicon; and securing the first surface of the nozzle layer to a substrate includes securing the first surface of the nozzle layer to silicon.

4. The method of claim 3, wherein securing the first surface of the nozzle layer includes direct silicon bonding the substrate to the multi-layer silicon substrate.

5. The method of claim 1, wherein:

etching the recess into the first surface of a nozzle layer includes etching into silicon; and securing the first surface of the nozzle layer to a substrate includes securing silicon oxide to silicon.

6. The method of claim 1, further comprising reducing a thickness of the nozzle layer prior to etching the recess.

7. The method of claim 6, wherein reducing the thickness of the nozzle layer includes grinding.

8. The method of claim 6, wherein reducing thickness of the nozzle layer includes polishing.

9. The method of claim 1, wherein etching the recess into the first surface of the nozzle layer of the multi-layer silicon substrate includes etching a silicon layer of a silicon-on-insulator substrate.

10. The method of claim 9, wherein reducing a thickness of the nozzle layer includes grinding the nozzle layer to a thickness of about 5 to 200 microns.

11. The method of claim 10, wherein reducing the thickness of the nozzle layer includes grinding the nozzle layer to a thickness of about 40 to 60 microns.

12. The method of claim 1, wherein etching the recess includes using an anisotropic etch process.

13. The method of claim 1, wherein etching the portion of the nozzle layer includes using a deep reactive ion etch process.

14. The method of claim 1, wherein removing the portion of the multi-layer silicon substrate includes grinding.

15. The method of claim 1, wherein removing the portion of the multi-layer silicon substrate includes etching.

16. The method of claim 1, further comprising removing the silicon oxide layer after the anisotropic etch of the region on the exposed side.

17. The method of claim 16, wherein removing the silicon oxide layer includes etching.

18. The method of claim 1, wherein:

etching the recess includes etching the recess such that the recess is not formed in the silicon oxide layer.

19. The method of claim 18, wherein etching the recess includes etching the recess at least until the silicon oxide layer is exposed.

20. The method of claim 1, wherein:

etching the recess includes stopping etching before the recess extends through the entire nozzle layer; and removing a portion of the multi-layer silicon substrate includes removing a portion of the nozzle layer from a second surface of the nozzle layer to expose the recess, the second surface being opposite to the first surface.

21. The method of claim 1, wherein removing a portion of the multi-layer silicon substrate includes exposing a second surface of the nozzle layer.

22. A method of forming a device, comprising:

polishing a silicon nozzle layer of a silicon-on-insulator substrate having a handle silicon layer and an oxide layer adjacent to the silicon nozzle layer;

etching a first surface of the silicon nozzle layer to form a recess having tapered sidewalls and a bottom surface having a first width measured in a direction parallel to the first surface;

aligning the etched silicon-on-insulator substrate with a flow path substrate such that the recess is fluidly coupled to an etched feature in the flow path substrate and the flow path substrate includes silicon;

direct silicon bonding the first surface of the silicon nozzle layer of the silicon-on-insulator substrate to the flow path substrate;

after the direct silicon bonding, removing the handle silicon layer from an exposed side of the silicon-on-insulator substrate;

etching at least a portion of the oxide layer and a portion of the silicon nozzle layer from a handle layer side of the silicon-on-insulator substrate using a mask, the etching including an anisotropic etch of a region on the handle layer side having a second width measured in the direction parallel to the first surface, the second width greater than the first width such that portions of the tapered sidewalls of the recess are removed using the mask, and after the anisotropic etch of the region on the handle silicon layer side, removing the mask.

23. A method of forming a device, comprising:

anisotropically etching a first surface of a layer to form a recess having tapered walls and a recessed surface that is substantially parallel to the first surface of the layer, the recessed surface having a first width measured in a direction parallel to the first surface; and etching, using a mask comprising silicon oxide, a region of a second surface of a layer that is opposite to the first surface to form an outlet having substantially straight walls within ±1° around a central axis, the region having a second width measured in the direction parallel to the first surface, the second width greater than the first width such that the etching removes portions of the tapered walls of the recess; and after etching the region of the second surface, removing the mask.

24. The method of claim 23, wherein etching the region of the second surface includes deep reactive ion etching.

* * * * *

UNITED STATES PATENT AND TRADEMARK OFFICE

CERTIFICATE OF CORRECTION

PATENT NO. : 8,377,319 B2
APPLICATION NO. : 12/027597
DATED : February 19, 2013
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 992 days.

Signed and Sealed this
Twenty-fifth Day of November, 2014

Michelle K. Lee

Michelle K. Lee
*Deputy Director of the United States Patent and Trademark Office*